(12) United States Patent
Fernandez

(10) Patent No.: US 7,070,036 B2
(45) Date of Patent: Jul. 4, 2006

(54) POWER TAKEOFF DEVICE

(75) Inventor: Rickey Joe Fernandez, Broken Arrow, OK (US)

(73) Assignee: Muncie Power Products, Inc., Muncie, IN (US)

( * ) Notice: Subject to any disclaimer, the term of this patent is extended or adjusted under 35 U.S.C. 154(b) by 246 days.

(21) Appl. No.: 10/650,748

(22) Filed: Aug. 29, 2003

(65) Prior Publication Data

US 2005/0045446 A1 Mar. 3, 2005

(51) Int. Cl.
*F16D 37/02* (2006.01)
*B60K 25/00* (2006.01)

(52) U.S. Cl. ............... 192/109 R; 192/70.12; 192/70.2; 192/85 AA (58) Field of Classification Search .............. 74/15.86; 192/70.12, 70.2, 85 AA, 109 R, 113.34
See application file for complete search history.

(56) References Cited

U.S. PATENT DOCUMENTS

| | | | |
|---|---|---|---|
| 3,041,884 A | | 7/1962 | Elfes |
| 3,507,372 A | * | 4/1970 | Gilbertson et al. ....... 192/18 R |
| 3,540,297 A | | 11/1970 | Wagner et al. |
| 3,763,976 A | | 10/1973 | Prokop et al. |
| 3,831,722 A | | 8/1974 | Deschamps |
| 3,872,954 A | | 3/1975 | Nordstrom et al. |
| 4,031,780 A | | 6/1977 | Dolan et al. |
| 4,108,291 A | | 8/1978 | Zenker |
| 4,275,607 A | | 6/1981 | Snoy |
| 4,287,778 A | | 9/1981 | Quick |
| 4,399,715 A | | 8/1983 | Dziuba et al. |
| 4,479,399 A | | 10/1984 | Narveson et al. |
| 4,566,572 A | | 1/1986 | Flotow et al. |
| 4,594,906 A | | 6/1986 | Vincent et al. |
| 4,597,301 A | | 7/1986 | Weis et al. |
| 4,640,378 A | | 2/1987 | Dobberpuhl et al. |
| 4,686,869 A | | 8/1987 | Beim |
| 4,718,305 A | | 1/1988 | Umemoto |
| 4,751,989 A | * | 6/1988 | Shinokawa et al. ....... 192/13 R |
| 4,811,614 A | | 3/1989 | Lasoen |
| 4,944,193 A | | 7/1990 | Harada et al. |
| 5,070,982 A | | 12/1991 | Pitchford |
| 5,099,936 A | | 3/1992 | Irikura et al. |
| RE34,023 E | | 8/1992 | Weis et al. |
| 5,228,355 A | | 7/1993 | Smith et al. |
| 5,287,939 A | | 2/1994 | Fernandez |
| 5,388,473 A | | 2/1995 | Black |
| 5,400,862 A | | 3/1995 | Behlke et al. |
| 5,415,257 A | * | 5/1995 | Shimamura et al. .......... 192/15 |
| 5,528,950 A | | 6/1996 | Organek et al. |
| 5,542,306 A | | 8/1996 | Fernandez |

(Continued)

FOREIGN PATENT DOCUMENTS

| | | |
|---|---|---|
| CA | 2164894 | 2/2000 |
| CA | 2266144 | 3/2003 |
| EP | 0 952 027 A2 | 6/2004 |

*Primary Examiner*—Saul Rodriguez
(74) *Attorney, Agent, or Firm*—Hall, Myers, Vande Sande & Pequignot (57) ABSTRACT

A power takeoff having an output shaft, an output gear and a connect-disconnect clutch mechanism for connecting the output gear to the output shaft, the clutch mechanism, including a clutch hub, a disc stack slidably mounted between the output gear and the clutch hub and a piston for compressing the disc stack-thereby to bring the output shaft into rotatable engagement with the transmission of an engine; in which the clutch hub is normally biased by a spring away from the piston but is confined by snap rings to limit the hub's movement along the output shaft in such a manner so that substantially no operational force is placed on the snap rings during compression of the disc stack.

7 Claims, 6 Drawing Sheets

U.S. PATENT DOCUMENTS

| | | |
|---|---|---|
| 5,713,445 A | 2/1998 | Davis et al. |
| 5,716,299 A | 2/1998 | Sommer |
| 5,913,547 A | 6/1999 | Fernandez |
| 5,953,959 A | 9/1999 | Organek et al. |
| 6,003,391 A | 12/1999 | Kojima et al. |
| 6,038,936 A | 3/2000 | Butkovich et al. |
| 6,142,274 A | 11/2000 | Warner |
| 6,179,745 B1 | 1/2001 | Beam, III et al. |
| 6,250,445 B1 | 6/2001 | Davis |
| 6,260,682 B1 * | 7/2001 | Rang et al. .............. 192/70.19 |
| 6,305,515 B1 | 10/2001 | Heidenreich et al. |
| 6,378,682 B1 | 4/2002 | Mohan et al. |
| 6,396,173 B1 | 5/2002 | Prampolini |
| 6,401,896 B1 | 6/2002 | Schnepf |
| 6,446,774 B1 | 9/2002 | Porter |
| 6,458,056 B1 | 10/2002 | Brown et al. |
| 6,513,615 B1 | 2/2003 | Bowen et al. |
| 6,530,463 B1 | 3/2003 | Beck |
| 6,533,090 B1 | 3/2003 | Osborn et al. |
| 6,533,095 B1 | 3/2003 | Mohan et al. |

* cited by examiner

POWER TAKEOFF DEVICE

This invention relates to power takeoff devices (herein "PTO's") useful for mounting on vehicle transmissions for performing, directly or indirectly, useful work via its selectively rotatable output shaft. More particularly this invention relates to such PTO's which employ an improved clutch disc pack assembly for selective engagement and disengagement of the PTO output shaft with its input shaft.

BACKGROUND OF THE INVENTION

The use of a power takeoff device (herein referred to by its art recognized abbreviation "PTO") in association with truck or other vehicle (or stationary engine) transmissions is well-known. Generally speaking, such PTO's often include an input gear, an output gear and a mechanism for engaging the input gear with the output gear so as to rotate the output shaft of the PTO to power an auxiliary device, with or without the use of an intervening hydraulic pump, to perform useful work when desired. The mechanism also provides a means for disengaging these two gears.

The input gear of the PTO is, in certain popular designs, constantly engaged when installed on the vehicle's transmission with the appropriate gear in the transmission and is, thus, always turning whenever that gear in the vehicle's transmission is turning. A clutch mechanism is then conventionally provided between this input gear of the PTO and the output gear, enabling selective rotation of the output shaft of the PTO (associated with the output gear). When this output shaft is rotated, useful auxiliary work can be performed by the vehicle in a known, conventional fashion, for example, by connecting the output shaft to a hydraulic fluid pump having a fluid reservoir system, which hydraulic fluid under pump pressure generated by the turning PTO output shaft, in turn, is used to operate auxiliary equipment. Just a few examples of such auxiliary equipment are garbage compacting bodies, dump bed bodies (a/k/a, "dump trucks"), garbage trucks or trailers, winches, post hole diggers, and the like.

An example of such a PTO with an appropriate and effective engage/disengage clutch mechanism is disclosed in my commonly owned U.S. Pat. No. 5,542,306, issued Aug. 6, 1996. An embodiment thereof is illustrated herein in FIG. 1 (prior art). While certain differences exist between FIG. 1 and the embodiment in U.S. Pat. No. 5,542,306, they are each generally representative of a popular commercial clutch operated PTO upon which this invention now improves.

Figure 1:
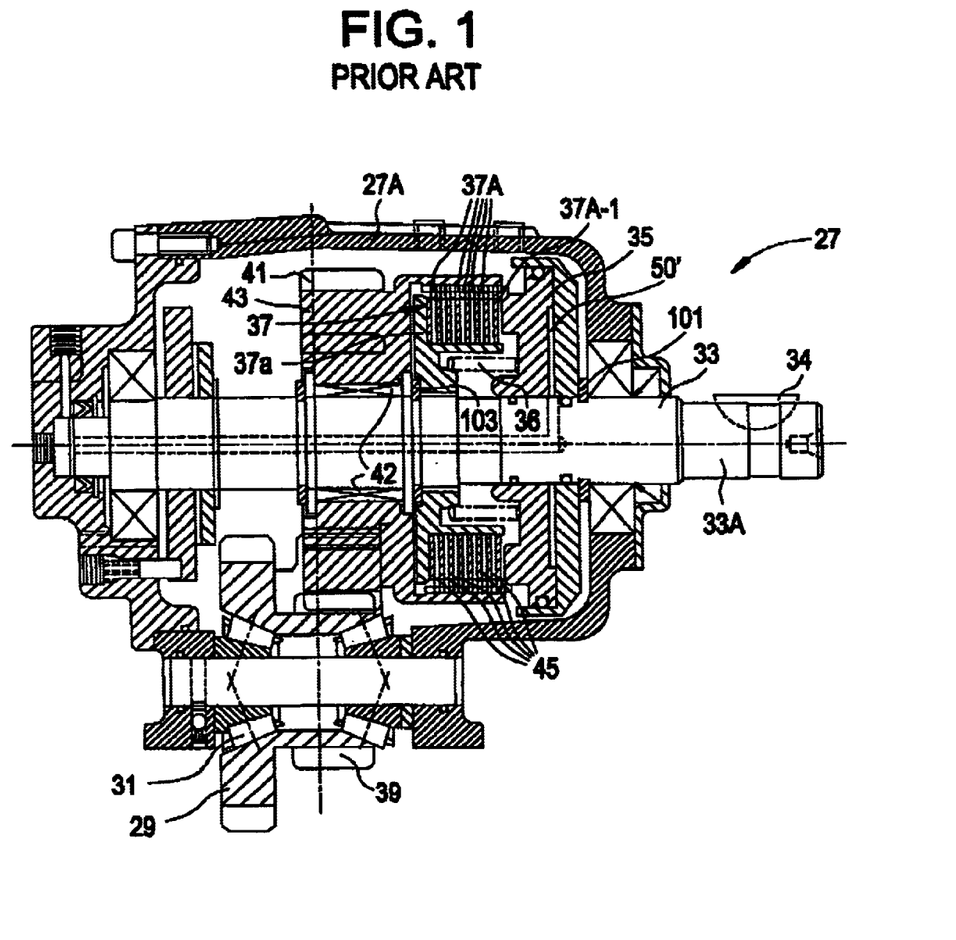
FIG. 1 (Prior Art) is a side plan, partially sectionalized view of a prior art PTO improved upon by the subject invention.

With specific reference, in this respect, to FIG. 1 (prior art) and as more fully described in the aforesaid U.S. Pat. No. 5,542,306, there is disclosed a power takeoff 27 having a housing 27A, which conventionally includes a customer/input gear 29. Input gear 29 is coupled to input ratio gear 39. In practice, ratio gear 39 is usually provided with a specific gear ratio applicable to the particular truck's (or other type vehicle's or stationary apparatus') transmission needs and the selected torque output desired. Cone bearings 31 are also provided. Gear ratios from 5–8 are conventional. Also, conventionally provided in this former PTO is power takeoff output shaft 33 which is provided with a stub end 33A that connects power takeoff 27 via key 34 (e.g., a woodruff key) to an extension shaft (not shown for convenience) which, in turn, conventionally leads to a hydraulic fluid pump operated by rotation of this shaft. Alternatively, stub end 33A of shaft 33 may be directly connected to a hydraulic pump or to any auxiliary equipment directly operable by the shaft, thereby to provide, for example, when it is directly connected to a pump, in a known manner, a "direct mount" PTO/pump configuration. In either this "direct mount" configuration, or in the "remote mount" configuration (see FIG. 3, discussed below), unwanted rotation of shaft 33 0 may be prevented in the invention herein, in the same way, as described in the aforesaid U.S. Pat. No. 5,542,306 by providing a drag brake mechanism which constantly applies a sufficient braking force to prevent shaft rotation when the clutch discs operating means is operated to disengage the 5 discs. The drag brake, however, is designed to apply an insufficient force so that it is overcome when the discs are engaged, thereby allowing the shaft to rotate. This feature, fully disclosed in the aforesaid patent, is not illustrated herein for convenience, but may be used in o combination with this invention herein below described, as an option, as will be evident to one skilled in the art.

Associated with the operation of gear means 29 and shaft 33, in FIG. 1, is a connect, disconnect clutch mechanism. Such a mechanism includes piston 35 and clutch S hub 37. To clutch hub 37 there is attached a plurality of friction discs 37A (shown in FIG. 1). Piston 35 and clutch hub 37 are attached to shaft 33 so as to rotate whenever shaft 33 rotates. Hub 37 is non-movably attached to shaft 33, while piston 35 is slidably attached thereto. Spring 36 is located between hub 37 and piston 35 and normally biases piston 35 away from rearward most friction disc 37A-1 in the friction disc stack 37A.

Constantly rotating with the rotating gears of the truck's transmission and, thus, not permanently attached or connected to shaft 33, are customer/input gear means 29, input ratio gear means 39 and output gear means 41 (including hub 43). This sub-assembly is allowed to rotate about shaft 33 on needle roller bearing 42 whenever the PTO is engaged with the rotating gears of the truck's transmission, even when the clutch mechanism has successfully achieved its disengage position so that shaft 33 is not rotating. Output gear means 41 has attached thereto, i.e., to hub 43, a plurality of spacer discs 45 located so as to be interspersed between friction discs 37A. Spacer discs 45, of course, rotate whenever the aforesaid sub-assembly rotates. Properly operating, friction discs 37A, attached to clutch hub 37, do not rotate when the clutch mechanism is in its disengaged position (as shown). Thus, rotating spacer discs 45 merely rotate between, their respective friction discs 37A until compressed into contact with friction discs 37A by piston 35 to cause, via friction in the stack, all discs to rotate together. This, then, enables selective rotation of shaft 33.

As alluded to above, to prevent unwanted rotation, such as by incomplete disengagement due to various possibilities the aforesaid U.S. Patent No. 5,542,306 provides a unique drag brake mechanism for preventing such unwanted rotation. Such a drag brake mechanism as disclosed in this aforesaid patent (No. 5,542,306) may also be optionally provided in he practice of the subject invention for the same purpose of preventing unwanted rotation.

While the aforesaid PTO disclosed in the '306 patent and/or as shown in slightly different form in FIG. 1 nor art) proved in actual practice to be quite advantageous, it was found that further improvement was desirable. In this respect and with further reference to FIG. 1, it was found in practice that the snap rings 101 and 103 eventually fatigued to breakage when employed on a vehicle (or in other uses) which required exceptionally high shift cycle applications. The use of heavy duty snap rings to overcome this drawback, proved to offer only marginal improvement in the useful life of these rings. This was due to the fact that snap rings 101 and 103 inherently functioned to contain the clutch pack friction forces. This, in turn, created not only the need for heavy duty snap rings, but gave rise to a need in high shift operational applications for another solution which would allow for the use of regular duty snap rings without incurring the frequency of the fatigue problem referenced above, at times even with heavy duty snap rings.

It is a purpose of this invention to fulfill this and other needs in the art which will become more apparent to those skilled in the art once given the following disclosure.

SUMMARY OF THE INVENTION

This invention fulfills the above-described needs in the art by providing a power takeoff device in which there is provided an input gear connectable to the transmission of an engine and a rotatable output shaft selectively connectable to the input gear and wherein there is further provided a connect-disconnect clutch mechanism capable of selectively connecting and disconnecting the output shaft into and out of connection, respectively, with the input gear and in which the connect-disconnect clutch mechanism includes:

an output gear;

a clutch hub;

at least two spaced locator members for confining the clutch mechanism to a selected location along said output shaft;

a disc stack comprised of a plurality of discs alternately connected between said output gear and said to clutch hub;

a piston so located with respect to the disc stack so as to be capable upon movement of the piston of compressing the discs into frictional engagement in the disc stack;

biasing means normally biasing the piston out of is compressing frictional engagement with said disc stack; and a spacer member so located with respect to said disc stack such that during compression of said disc stack by said piston substantially no operational force is imposed on said locator rings.

In certain embodiments of this invention, the aforesaid PTO also includes in combination therewith, control means for selectively moving said piston into and out of compressing engagement with said piston. In certain preferred embodiments, in this respect, such control means includes a valve operatively associated with the transmission fluid of the transmission to which the PTO is attached, for selectively providing such fluid under pressure to move said piston into operative engagement with the disc stack and to exhaust the fluid to allow said piston to be operatively disengaged from the disc stack.

This invention will now be described with respect to certain embodiments thereof as illustrated in the following drawings wherein:

DETAILED DESCRIPTION OF CERTAIN EMBODIMENTS OF THIS INVENTION

Figure 2:
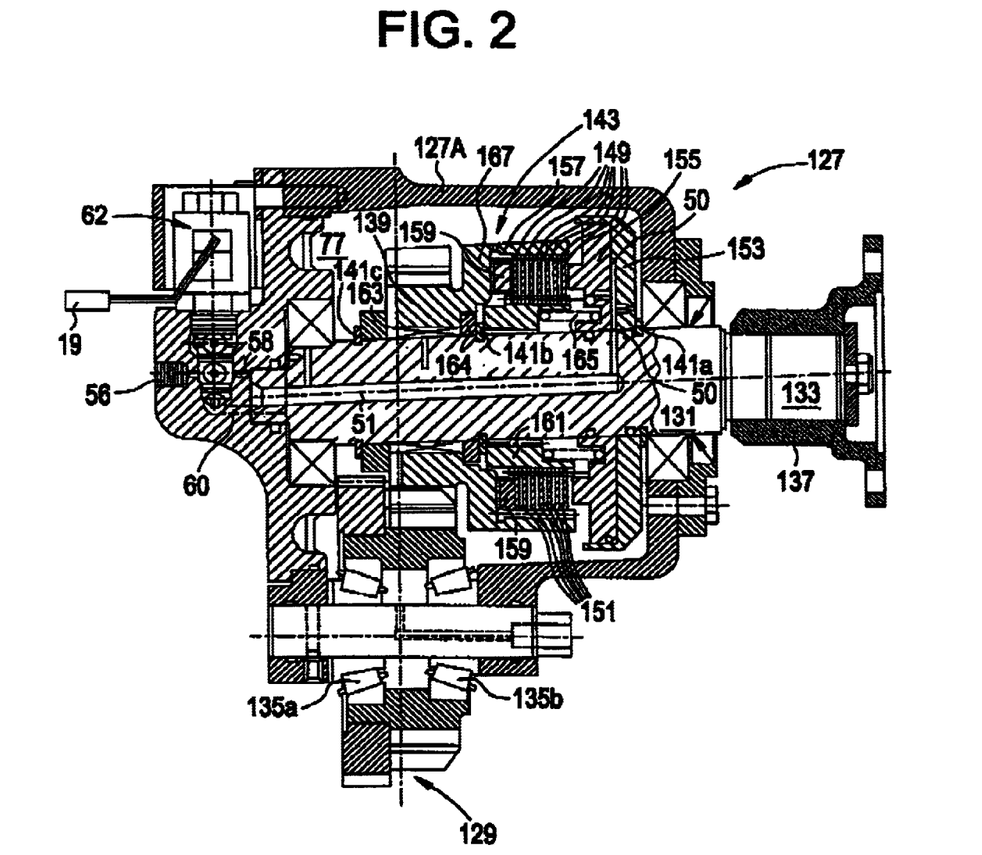
FIG. 2 is a side plan, partially sectionalized view of an embodiment of this invention.

Reference is initially made to FIGS. 1-2. FIG. 1 is the aforesaid prior art improved upon by this invention. FIG. 2 illustrates a preferred embodiment of this invention which improves upon the PTO of FIG. 1. In this respect, one skilled in the art will immediately recognize the substantial correspondence between various common elements employed in FIG. 1 (prior art) and those illustrated and described in the aforesaid U.S. Pat. No. 5,542,306, although the two prior art devices are not identical. Moreover, the skilled artisan will also notice the substantial correspondence, as well, between these two prior art devices (FIG. 1 and the '306 patent) with similar elements in the embodiment of this invention illustrated in FIG. 2. Different numerals at times will be used in FIG. 2 than in FIG. 1, even though the elements are the same or similar, as a matter of convenience and for a clearer understanding of the improvement provided by this invention. Moreover, FIG. 2 illustrates a different end connection 133 to output shaft 131 than the different, but equally well-known end connection 33A, 34 as shown in FIG. 1. Such an end as shown in FIG. 1, of course, may also be employed herein in place of end connection 133 (i.e., end connection 33A, 34 may be substituted for end connection 133 in FIG. 2 as an optical embodiment contemplated by this invention).

With reference to FIG. 2, there is illustrated a PTO 127 having a housing 127A of a generally conventional shape. Likewise, in similar, conventional fashion, there is provided a customer/input gear 129 coupled to input ratio gear 139 (usually provided with a specified gear ratio applicable to the particular vehicle's transmission and selected torque output desired) along with cone bearings 135a, b. The specific gear ratio chosen is well within the skill of the artisan. Ratios of 5–10 are generally recognized as conventional for many applications.

Turning now to the unique mechanism of this invention as illustrated herein (e.g., FIG. 2) for selectively rotating and disengaging from rotation, operational output shaft 131, there is first provided, of course, output shaft 131 having end 133. End 133 extends from within housing 127A outwardly therefrom, in practice toward a remotely (or directly) mounted hydraulic pump. For example, in FIG. 3, in order to connect PTO shaft 131 to remotely mounted pump 9 via extension shaft 11, a conventional U-joint flange 137 is provided at end 133 of shaft 131 (see also, FIG. 2).

As shown in FIG. 2, connected to shaft 131 about its circumference and along its length, are three locator snap rings 141*a,* 141*b,* and 141*c.* Rings 141*a* and 141*c* generally confine and, thus, locate the entire clutch mechanism, generally at 143, between them. The combination of the two rings 141*a* and 141*b,* in this respect, confine and locate only selected parts thereof between them, while the combination of the two rings 141*b* and 141*c* confine and locate only other selected parts between these two rings. This, in turn, then makes up an entirety of the confining, locating ring structure.

Within this ring locating and confining clutch mechanism, and as a part thereof, there is provided a clutch disc pack which includes a plurality of spaced friction discs 149 and spacer discs 151. Spacer discs 151 are alternately (and conventionally) interposed between friction discs 149. The number of discs chosen depends on the application. Generally, as illustrated, seven (7) friction discs 149 with six (6) spacer discs 151 alternating therebetween are found adequate for most truck auxiliary equipment applications. Other numbers, higher or lower may be used. For example, the friction discs may number as high as 11, with the spacers therebetween. Generally, it is preferred that the friction discs 149 (as shown in solid black) be both the first and the last discs in the stack. Thus, the spacer discs will usually number one disc less than the friction discs. Both types of discs are of known construction and material.

Proximal shaft 131's end, before it emerges from housing 127A and in a circumferential groove thereof or by other known attachment, there is provided snap ring 141*a.* Confined and, thus, located by snap ring 141*a,* is piston cup 153 which, in turn, houses piston 155. At the opposite end of clutch mechanism 143 is output gear 139 which is provided with a longitudinal flange portion 157 forming a cup-like housing for disc stack 149, 151. A spacer plate 159 is provided, preferably by loose compression fit, within this cup-like housing of output gear 139.

Further provided in this clutch mechanism 143 is clutch hub 161. As can be seen in FIG. 2, and in contrast to o FIG. 1 (prior art), clutch hub 161 is of a significantly different design than clutch hub 37 (FIG. 1) or of the clutch hub 37 illustrated in the embodiment of U.S. Pat. No. 5,542,306. In this respect, clutch hub 161, for example, as can be seen in FIG. 2, has no radially extending flange as does the hub in FIG. 1 (e.g., item 37*a.* See also item 37 in aforesaid U.S. Patent No. 5,542,306). With this s radial flange now eliminated, the clutch mechanism of this invention operates in a manner which essentially eliminates any substantial operational force being imposed on the snap rings. By "operational forces" herein is meant those forces imposed during operation (actuation and deactivation) of the PTO which tend to substantially shorten the useful life of the snap rings. Indeed, the only force realistically, now remaining in the practice of this invention, is that of the compressed coil spring 165, which through proper design within the skill of the artisan to determine for any particular application, will have no significant effect upon the useful life of the confining, i.e. locating, rings (e.g., 141*a, b, c*) which are preferably of a simple, known snap ring type and construction.

In this respect, it can be seen that the structure presented in FIG. 2 operates to essentially eliminate any significant or substantial life span reducing forces on the otherwise vulnerable snap rings 141*a, b, c.* This is achieved in the following manner:

Coil spring 165 normally biases piston 155 out of engagement with the disc pack (which is made up of alternating discs 149, 151, respectively). However, any force from this spring 165 that would normally be imposed on snap ring 141*a* is virtually (substantially) eliminated because piston cup 153 is non-movably secured to shaft 131. Thus, this large piston cup structure 153 takes up substantially all forces of spring 165 that could adversely affect ring 141*a,* as well as the force of the hydraulic fluid when piston 155 is actuated in the disc engagement as this force would otherwise be imposed on ring 141*a.*

Discs 149 (shown in solid lines, FIG. 2), in this respect, are slidably splined to clutch hub 161, while intermediate discs 151 are slidably splined to output gear 167's longitudinal flange portion 157. This splined attachment of the discs allows the discs to slide axially (i.e., in the direction of movement of piston 155) during their compression by piston 155 or during their relaxation from compression by retraction of piston 155 via return of coil spring 165.

In order to now substantially eliminate any life-shortening operational forces on locator ring 141*b* and locator ring 141*c* (each preferably of a known snap ring construction similar to snap ring 141*a*), a spacer 159, a first force absorbing ring 163, and a second force absorbing ring 164 are provided. Rings 163 and 164 are each non-movably secured to shaft 131. In this respect, absorbing ring 164 backs up and protects snap ring 141*b,* thus, taking up substantially all forces on ring 141*b* caused by compression of spring 165. Force absorbing ring 163 protects locator ring 141*c* in a similar manner.

Spacer plate 159, in this respect, is designed so as to be lightly press fit into the space between flange 167 and the disc pack when piston 155 is disengaged (i.e., retracted as shown in FIG. 2). When piston 155 is then actuated (as described below) to engage and compress the disc pack, thereby to commence rotation of output shaft 131, the bias of spring 165 is overcome. At this time, spacer plate 159 is caused to tightly engage flange 167. In turn, flange 167 (and, thus, the body of input ratio gear 139) then transfers the resultant force into large, non-slidable (i.e., secured to shaft 131) spacer ring 163. This then avoids transference of any substantial force into the snap rings, because large ring 163, being firmly secured onto shaft 131, prevent any substantial force from being transferred to the snap rings 141*a* or 141*b* or 141*c* (along with, of course, the use of spacer 159) as piston 155 engages the disc stack. Moreover, as can be seen, no substantial force on these snap rings occurs during the opposite operation, i.e., when disengaging piston 155 from the disc stack and returning it to its retracted position as shown in FIG. 2. In this manner then, large elements 159, 163 and 164, as well as piston cup 153 are the operative elements which are designed to take up the load caused by operation of the assembly because, as to elements 163, 164 and 153, they are each press fit or otherwise non-movably secured to the output shaft 131 and are designed to be large enough to take up the forces imposed on them.

In this respect, in certain preferred embodiments of this invention, both non-movable press fit piston cup 153 and non-movable press fit spacers 163, 164 are heat treated to provide appropriate strength and long life. While snap rings 141*a, b* and *c* are still employed, they, for all practical purposes, now serve only as locators for the clutch parts.

Figure 3:
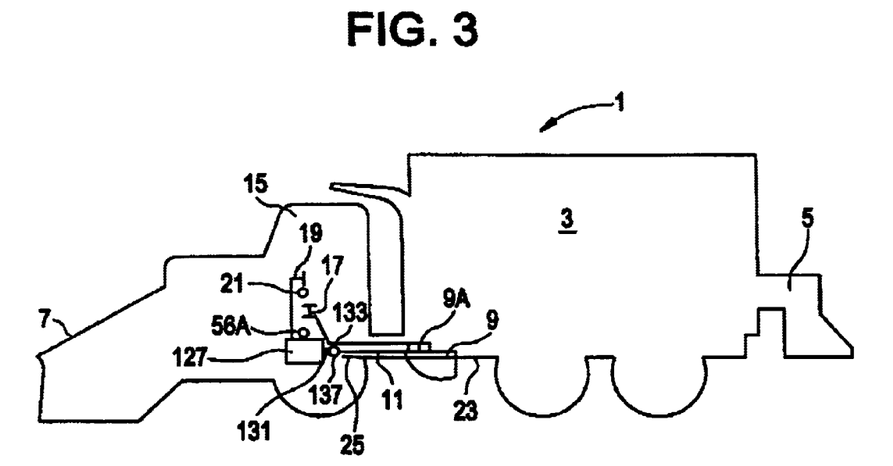
FIG. 3 is a side plan schematic view of a truck having the embodiment of FIG. 2 mounted thereon for enabling useful auxiliary work to be performed by the truck.

Turning now to FIG. 3, there is illustrated a conventional commercial truck environment in which the subject invention finds particularly advantageous use. As illustrated, in this embodiment, dump truck 1 is provided with a known, conventional dump body 3 (operated by a conventional hydraulic cylinder hoist, not shown for convenience), salt spreader S and a snow plow 7, all of known design. Each of these three auxiliary pieces of equipment (3, 5 and 7), moreover, is operated using known conventional mechanisms via hydraulic pump 9. Hydraulic pump 9, in further conventional fashion, is remotely mounted on the truck chassis away from power takeoff device 127 (e.g., PTO 127 as shown in FIG. 2). Connecting output shaft 131 of PTO 127 to pump 9 is rotatable extension shaft 11 (also of a known, conventional design). Such a truck, when operated, involves numerous PTO engagements and disengagements (e.g., PTO cycles) and, thus, in the past experienced higher than desired wear on and, at times, failure of the locator snap rings.

While FIG. 3 illustrates at typical "remote mount" PTO/pump configuration, it is understood that this invention is equally applicable to so-called "direct mount" PTO/pump configurations wherein the pump is directly mounted to the output shaft of the PTO, rather than being connected thereto by an extension shaft as shown in FIG. 3. In addition, it is understood that the drag brake invention described and illustrated in U.S. Patent No. 5,542,306 may be used herein with this invention. Still further, it is also understood that other auxiliary equipment besides, or in addition to, items 3, 5 and 7 may be operated by this invention (utility truck, garbage compactor body, post hole digger, etc.).

In this respect, in conventional and known fashion for operating auxiliary items 3, 5 and 7 (as well as any other conventional auxiliary equipment) there may be conveniently located in cab 15 of truck (or other vehicle) 1, separate controls for operating pump 9 and PTO 127 (i.e., controls 17 and 19, respectively). In this respect, the controls in FIG. 3 are schematically illustrated to generally represent a variety of controls which are both known in the art and may be employed herein. For example, control 17 for pump 9 may be a conventional pull cable or a lever arm rod or air actuated mechanism, each of which is conventionally linked to pump 9's spool valve 9A (also of conventional design) which controls the flow and direction of hydraulic fluid to the various auxiliary features 3, 5 and/or 7, etc. on the truck, Of course, by operating the PTO control (as described more fully below) to engage piston 155 to compress the disc stack, output shaft 131 is, thus, caused to rotate, thereby powering pump 9 and the flow of hydraulic fluid therefrom as regulated by control 17 for pump 9 (all in a known, conventional manner). While cable or lever controls are useful, other types of controls known in the art may be employed as well, such as electronically operated solenoid controls or air actuated controls.

In one preferred way of actuating piston 155, for example, an electrically operated solenoid valve 62 of known design is employed (see FIG. 2). As illustrated here, solenoid valve 62 is electrically actuated by switch 19 located in the cab of the truck (FIG. 3). With reference, in particular to FIGS. 2-6, actuation of solenoid valve 62 causes, in a known way, pressurized transmission fluid from the transmission of the truck to flow via port 48 and valve spool 48A (FIGS. 4 and 5) through central orifice 51 (FIG. 2) in shaft 131 to a location SO behind piston 155. This, in turn, forces piston 155 against the bias of spring 165, compressing and overcoming it, thus, sliding piston 155 axially along shaft 131 (to which it is simply slidingly connected) until the disc stack is sufficiently compressed, via interdisc friction, to cause shaft 131 to rotate.

The selection of the degree of friction created within the disc stack of the clutch pack is conventional and is generally selected based upon the required output torque of shaft 131. In general, the torque must be large enough such that sufficient hydraulic fluid pressure is generated by pump 9 (by rotation of shaft 131) to perform the intended auxiliary work (e.g., referenced above). The biasing force to be created by coil spring 165 and, thus, the sire of this spring, is selected in a known way to those skilled in the art, so as to ensure full retraction of piston 155 after switch 19 activates solenoid valve 62, thereby to allow return flow (i.e., exhausting) of the transmission fluid from behind piston 155 back through central orifice 51 and out through exhaust port 54. Exhaust port 54, in this respect, leads to large PTO chamber 77 within PTO housing 127A. Housing 127A is, of course, in communication with the truck's transmission to which the PTO is connected (usually via a "window" in the shell of the transmission). By this exhausting of transmission fluid and, thus, relief of the actuating pressure of the transmission fluid from behind piston 155, an appropriately chosen size for biasing coil spring 165 ensures retraction of piston 155's engagement with the disc stack.

While not shown herein for convenience, it is understood as aforesaid that a drag brake may be employed to prevent inadvertent, unwanted rotation of shaft 131. Such a drag brake may be of any known design effective for its purpose. A preferred one for use in combination with this invention is disclosed in my aforesaid U.S. Pat. No. 5,542, 306.

Figure 4:
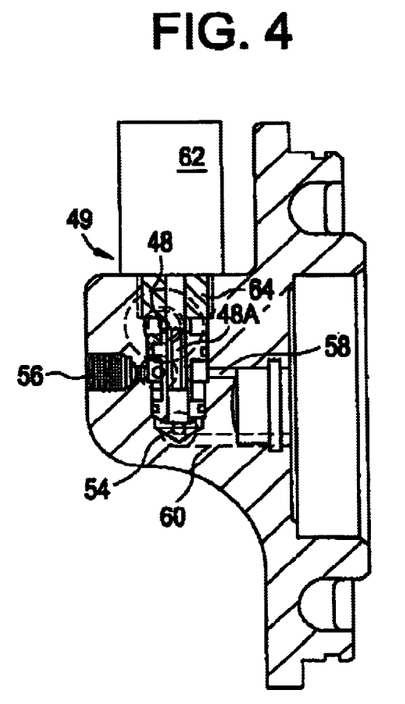
FIG. 4 is a side sectional view of an embodiment of a solenoid valve for use in FIG. 2, in its pressure (energizing) mode for compressing the disc pack of FIG. 2.
Figure 5:
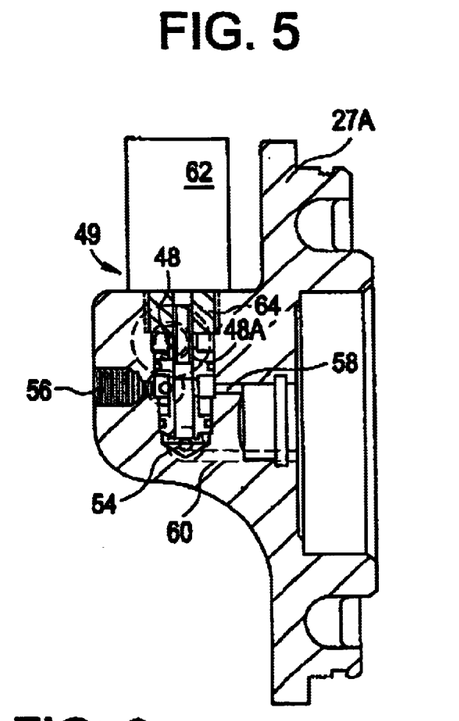
FIG. 5 is a side sectional view of the embodiment of the solenoid valve of FIG. 4 in its depressurizing (exhaust) mode for decompressing the disc pack of FIG. 2.

With respect to solenoid valve 49 and its operation, it is hereby contemplated that, while any conventional solenoid valve may be used, one type found useful in the practice of this invention is a P/N SV08–30–0–V–12–DW solenoid valve sold by Hydraforce, Inc. of Wheeling, Illinois. Another, and particularly preferred example of a valve useful herein, is a solenoid valve produced by Delta Power Co. (Rockford, Illinois) as P/N 886030692. Each of these types of valves is generally illustrated in FIGS. 2, 4 and 5. As best illustrated in FIGS. 4 and 5, such valves, through a series of lands and grooves in the spool 48A of solenoid valve 49's spool orifice, pressure port 48 and exhaust port 54 are alternately aligned with the transmission fluid to achieve the flow of fluid. In this way, the desired compressing activation or decompressing retraction of piston 155 is achieved. Moreover, sensor port 56 may be optionally provided for sensing pressure in shaft 131's central orifice 53. via high pressure orifice 58 (which leads to orifice 51). The purpose of port 56 is to indicate whether the clutch piston 155 is under pressure or not. Port 56 leads in conventional fashion (not shown for convenience) to warning light 56A located in the cab of truck 1 (FIG. 3) which turns "on" if there is pressure in port 56.

This indicator light 56A is coupled to PTO indicator switch light 21 (see FIG. 3) which when "on" informs the truck operator of the presence of ongoing useful operation of the PTO. In this respect, the system operates substantially as follows:

When the PTO switch 19 is pushed to "on," light 21 goes "on" if current has passed to the coils (not shown) of solenoid valve 62. This, then, causes spool 48A to move to the position shown in FIG. 4. Pressurized fluid is then caused to flow via port 48 through the fluid path in housing solenoid valve insert 64, through line 58 and orifice 51 to the small chamber 50 behind piston 155 (see FIG. 2). This same chamber is also shown in FIG. 1 as chamber 50.

Figure 6:
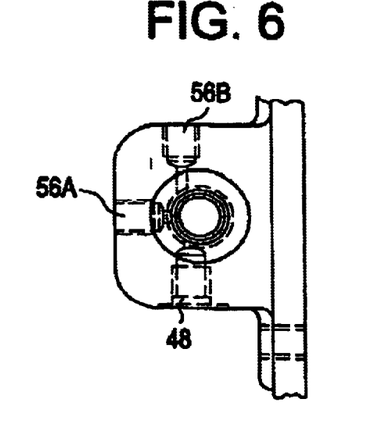
FIG. 6 is a partial top plan view of an embodiment of this invention.
Figure 7:
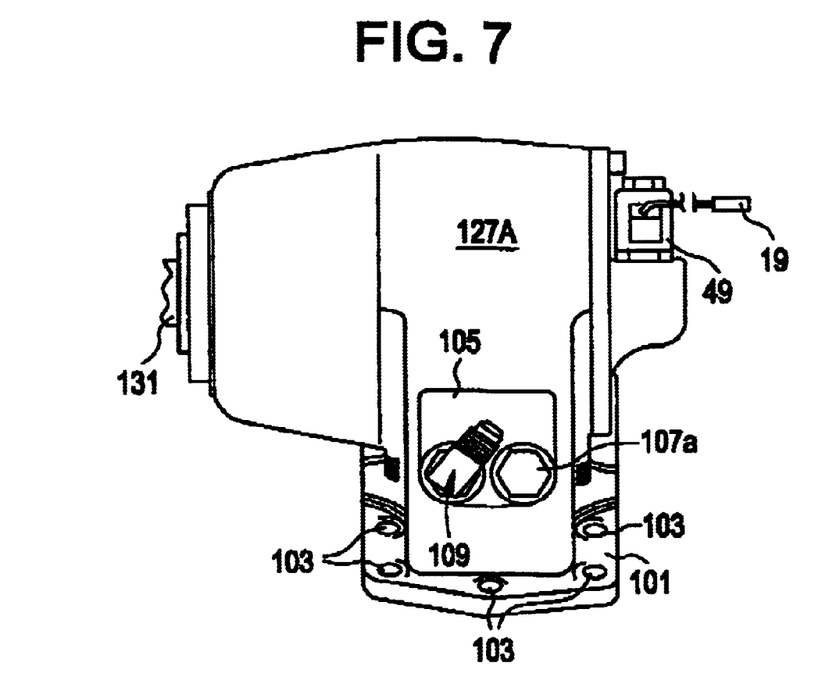
FIG. 7 is a partial exploded view showing the location of the cooling spray nozzle with respect to the PTO gears (if the PTO gears are on the left) in an embodiment of this invention.

With continued reference to FIGS. 4-6, exhaust port 54 and its return line 60, which leads to chamber 77 (Figure 2), are shut off as shown. Piston 155 is, thus, forced to its clutch engaging (i.e., disc stack compressing) position by the pressure of the fluid in chamber 50. As long as the pressure is sufficient to maintain piston 155 in its engaged position, light 56A will be "on," because sensor port 56 is quantitatively sensing this pressure in a known manner using a conventional sensor mechanism. In this respect, two o alternative sensor port's 56 (FIG. 5, ports 56a, 56b) at a 900 angle, apart from each other, may be provided for two convenient optional location of the sensor. Thus, when the light is "on" the operator knows that his PTO system is engaged and shaft 131 is rotating (if the truck engine is on and, thus, its relevant transmission gear 15 is turning). Then, when the PTO switch is turned to "off," solenoid 62's coil is deactivated, causing spool 48A to assume the position in FIG. 5. When this occurs, the orifices in insert 64 leading to pressure orifice 58 are blocked and the flow path exhausts the fluid from chamber 50 behind piston 155, causing piston 155 to move out of disc stack engagement (due to the force of biasing spring). The fluid in this exhaust mode flows from chamber 50 through orifice 51, orifice 58, port 54 and orifice 60 back into chamber 77. At the point where pressure at sensor port 56 (or 56a or b) drops below engagement pressure, light SEA is turned off, indicating to the operator disengagement of piston 155 from the disc stack and, thus, no rotation of shaft 131 either operating alone or with the aid of the force of a drag brake as disclosed above.

It can be seen that through the use of the above mechanism, the proper operation or failure of the system is readily apparent to the truck operator. If either light 21 or 56A is "off" when engagement is intended, the truck operator is alerted to a problem. If the PTO switch light 21 is "off" but the pressure light 56A remains "on" he is again alerted to a problem and the potential for an unwanted, rotating shaft that could cause unintended auxiliary operation, e.g., inadvertent raising of the dump bed. When both lights are "off" or "on" when intended, the system's functionality is manifested, barring some bizarre occurrence that proper maintenance should readily detect. In any event, through simple maintenance, the drag force constantly applied to shaft 131 (if employed), according to this invention, gives added assurance against unintended shaft rotation so long as the instrument panel's switches and warning lights are duly observed.

Referring now to FIGS. 7 to 10, a conventional spray nozzle cooling mechanism for cooling the PTO, including the optional brake assembly, of this invention without the need for further cooling means specially designed to handle the heat created by the drag force, if a drag brake is used as an option, is illustrated in combination with a more complete outside view of the PTO's housing. As shown best in FIG. 7, PTO housing 127A includes bottom plate 101 for bolting the PTO to the truck's transmission via bolts (not shown) which extend through bolt holes 103. In the side of housing 127A there is provided a window plate 105 having in it two screw thread plug orifices (107, left one shown in FIG. 8). One of the plug orifices 107 (here the left one) has provided in it cooling spray nozzle means 109. The other plug orifice 107 (here the right one) is plugged with screw plug 107A and is provided so that, if desired, a sensor means may be inserted for determining the speed of input gear 129.

Figure 8:
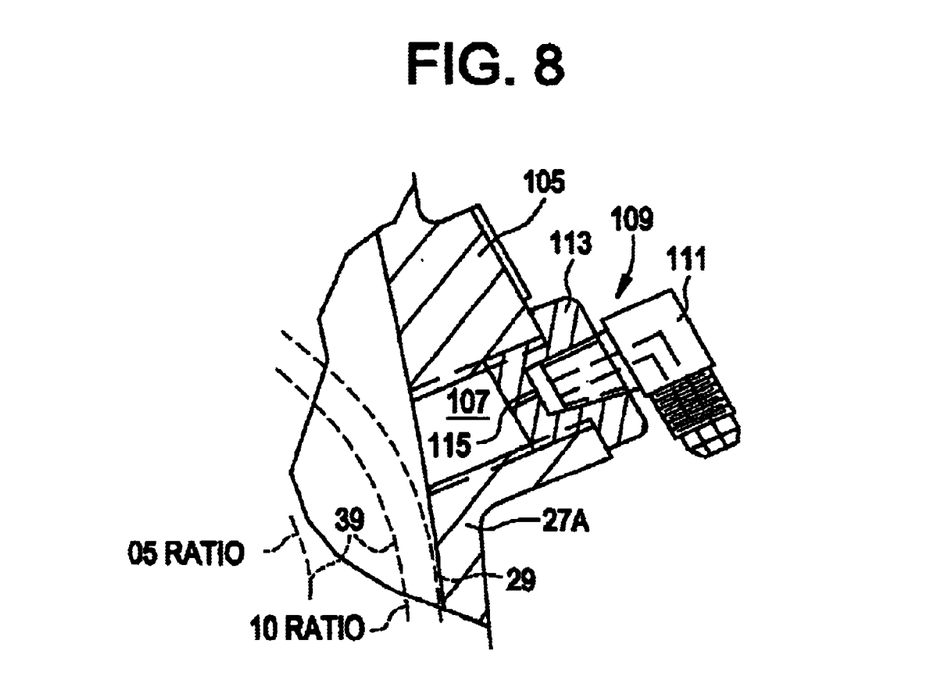
FIG. 8 is a partial, sectionalized view of the cooling spray nozzle of FIG. 7.

The nature of cooling spray nozzle means 109 is best illustrated in FIG. 8. Therein, spray nozzle 111 is attached to plate 105 (which may simply be an integral part of housing 127A, if desired) by adapter screw plug 113 having a narrow spray orifice 115 therein to direct a narrow stream of transmission fluid under pressure, aimed at the appropriate part of the PTO to optimize cooling. In one embodiment, the cooling stream of transmission fluid may be directed so as to be impelled upon the gear teeth of input ratio gear 129. This, in turn, causes a substantial spraying and splashing of the fluid throughout chamber 77 including into cooling engagement with all relevant parts of the drag brake mechanism (if optionally employed). Alternatively, of course, nozzle 109 may be aimed at the gear teeth of the customer/input gear portion of gear 129, or directly at the drag brake mechanism (if optionally equipped).

Figure 9:
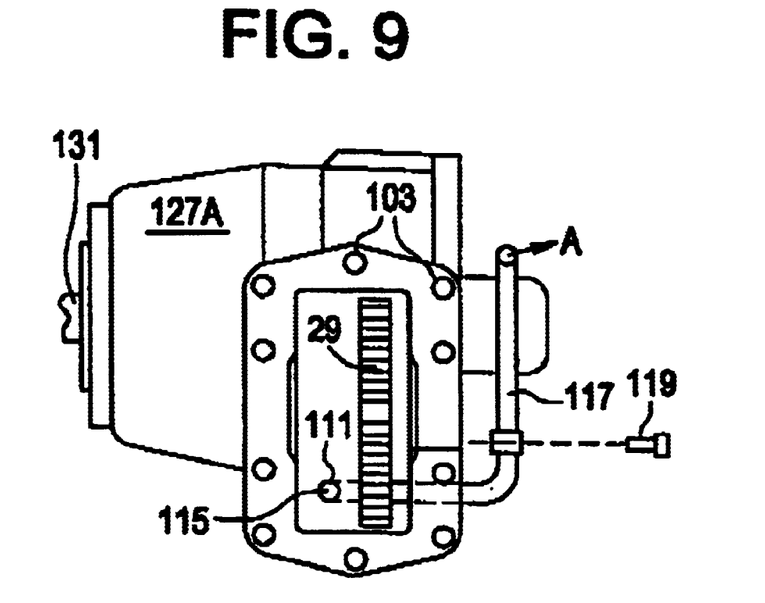
FIG. 9 is a schematized view showing the location of the spray nozzle with respect to the PTO gears, if the PTO gears are on the right.
Figure 10:
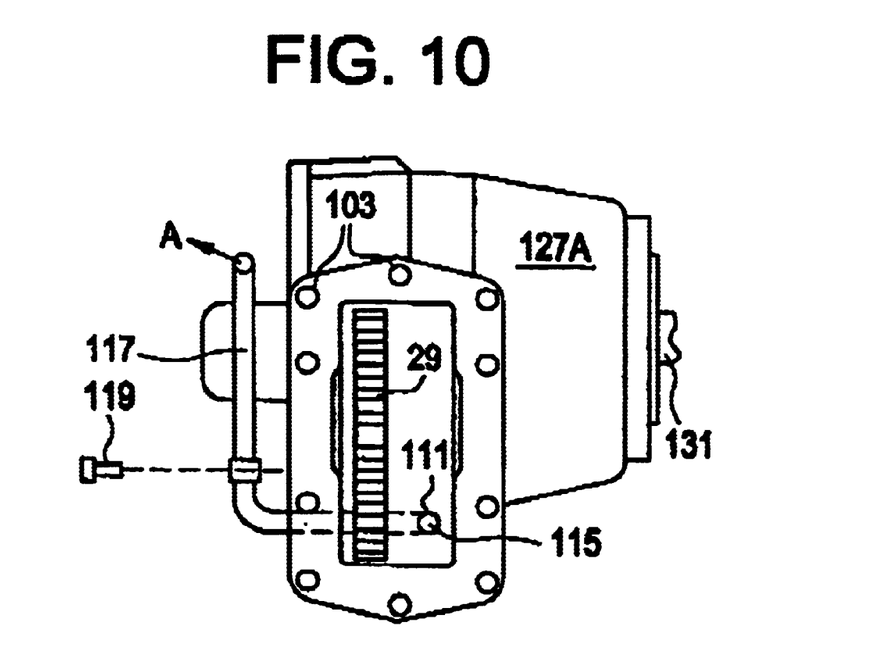
FIG. 10 is a schematized view showing the location of the spray nozzle with respect to the PTO gears if the PTO gears are on the left.

FIGS. 9-10 are schematic illustrations of a right hand and left hand assembly of a PTO according to this invention. Which assembly to use is conventionally chosen according to the configuration of the truck's transmission and underbody to which the PTO/pump arrangement must be connected. As therein illustrated, nozzle 111 is connected to the pressurized fluid of the truck's transmission via line 117 (as shown by arrow A). Line 117 is conveniently held to housing 127A by screw 119. In these embodiments, orifice 115 is aimed at the gear teeth of ratio gears 129 (not shown for convenience). Alternatively, as stated above, it may be aimed at the gear teeth of the customer/input gear portion of gear 129.

In certain embodiments of this invention, the controls for operating the PTO and pump, here shown in FIG. 3 within the cab of truck 1, may, instead, or redundantly as duplicates, be located outside the truck such as on the driver's side of the truck just to the rear of the cab. However, in many preferred embodiments, the PTO control 19 is located proximal the driver in the cab of the truck so that the aforesaid warning light 21 which is "on" (i.e., lit) when PTO 127 is engaged, can be readily observed when the truck is being driven, etc. This is an advantageous safety feature which alerts the driver to the potential, for example, of the dump bed inadvertently raising, or the other equipment operating, at a time when the driver mistakenly believed disengagement (non-operation) had been achieved. is Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A power takeoff device having an input gear connectable to the transmission of an engine and a rotatable output shaft selectively connectable to said input gear and a connect-disconnect clutch mechanism capable of selectively connecting and disconnecting said output shaft into and out of connection, respectively, with said input gear, said connect-disconnect clutch mechanism including:
    an output gear;
    a clutch hub;
    at least two spaced locator members for confining the clutch mechanism to a selected location along said output shaft;
    a disc stack comprised of a plurality of discs alternately connected between said output gear and said clutch hub;
    a piston so located with respect to said disc stack so as to be capable upon movement of said piston of compressing said discs into frictional engagement in said disc stack;
    biasing means normally biasing said piston out of compressing frictional engagement with said disc stack; and
    a spacer member so located with respect to said disc stack such that during compression of said disc stack by said piston substantially no operational force is imposed on said locator rings.

2. A power takeoff device according to claim 1, wherein said biasing means includes a spring and said power takeoff further includes a control mechanism connected to said piston for selectively engaging and disengaging the piston with respect to said aligned discs.

3. A power takeoff device according to claim 1, wherein said spacer member is a ring member attached to said output shaft and said piston is located at one end of said disc stack; and wherein said power takeoff device further includes a spacer located at the end of said disc stack opposite the end of said disc stack at which said piston is located.

4. A power takeoff device according to claim 3, wherein said spacer member is connected to said output shaft so as to rotate whenever said output shaft rotates.

5. A power takeoff device according to claim 3, is wherein said output shaft has a peripheral surface which has therein circumferential grooves and said snap ring are each located in a said circumferential groove in a manner such that a portion of said snap ring extends radially outwardly from said groove and wherein at least one snap ring is in abutment with said clutch hub.

6. A power take-off device according to claim 1, which further includes spray nozzles operatively connected to provide cooling fluid to a selected element of said PTO.

7. In a vehicle having a transmission, a power takeoff device operatively attached to said transmission and means for selectively engaging and disengaging said power takeoff device with a gear in said transmission, the improvement comprising, as said power takeoff device, the device of claim 1, 2, 3, 4, 5 or 6.

* * * * *